United States Patent [19]

Szirmai et al.

[11] Patent Number: 5,053,144

[45] Date of Patent: Oct. 1, 1991

[54] METHOD FOR THE MULTISTAGE, WASTE-FREE PROCESSING OF RED MUD TO RECOVER BASIC MATERIALS OF CHEMICAL INDUSTRY

[75] Inventors: Endre Szirmai; Sandor Babusek; Gezz Balogh; Atilla Nedves; Gyula Horvath, all of Budapest; Zoltan Lébényi; James Pinter, both of Mosonmagyarovar, all of Hungary

[73] Assignee: Aquatech Kernyezeteedelmi, Hungary

[21] Appl. No.: 503,259

[22] Filed: Apr. 2, 1990

Related U.S. Application Data

[63] Continuation of Ser. No. 459,705, Jan. 30, 1990.

[30] Foreign Application Priority Data

Jul. 31, 1987 [HU] Hungary .............................. 3524/87

[51] Int. Cl.$^5$ .............................................. C02F 11/00
[52] U.S. Cl. .................................... 210/770; 210/749; 210/773; 210/710; 210/724; 423/121; 423/132; 423/82; 423/86; 423/189; 423/150
[58] Field of Search ............... 210/710, 749, 758, 724, 210/726, 912, 768, 769, 770; 423/119, 121, 132, 82, 86, 189, 169, 208, 150, 140

[56] References Cited

U.S. PATENT DOCUMENTS

| | | | |
|---|---|---|---|
| 1,924,503 | 8/1933 | Lambert | 423/121 |
| 2,069,060 | 1/1937 | Fessler | 423/121 |
| 2,209,444 | 7/1940 | de Becze | 423/169 |
| 2,527,257 | 10/1950 | Judd | 423/121 |
| 3,295,924 | 1/1967 | Colombo | 423/121 |

FOREIGN PATENT DOCUMENTS 53-38374 3/1978 Japan .
1060656A 12/1983 U.S.S.R. .

OTHER PUBLICATIONS

Chemical Abstract: vol. 97, 1982: p. 282 Eurallumina Process for the Treatment ... Processing, Abstract No. 97:60332x.

*Primary Examiner*—Stanley S. Silverman
*Assistant Examiner*—Neil M. McCarthy
*Attorney, Agent, or Firm*—Ladas & Parry

[57] ABSTRACT

The method of the invention is advantageously applicable to realize a multistage chemical process during which liquid clarifiers suitable for the purification of water and sewage, furthermore, fine-disperse pulverulent solid products utilizable as pait pigments and fillers may be recovered. Each final product of the multistage chemical processes is a useful material, so the whole technology is waste free.

20 Claims, No Drawings

METHOD FOR THE MULTISTAGE, WASTE-FREE PROCESSING OF RED MUD TO RECOVER BASIC MATERIALS OF CHEMICAL INDUSTRY

This application is a continuation of application Ser. No. 07/459,705, filed Jan. 30, 1990.

TECHNICAL FIELD

The method of the invention is advantageously applicable to realize a multistage chemical process during which liquid clarifiers suitable for the purification of water and sewage, and fine-disperse pulverulent solid products utilizable as paint pigment and filler, may be recovered. Each final product of the multistage chemical processes is a useful material, so the whole technology is waste-free.

BACKGROUND ART

It is well-known that red mud, the final waste of the Bayer alumina production, provides great problems all over the world. This material is alkaline and it heavily contaminates when waters leak from red mud storage places—owing to both its alkali and iron oxide content. Furthermore, in dry condition, its fine fly-powder is easily blown away by the wind. The large quantity of red mud also causes problems, since an enormous area is needed for its storage. That is why a number of processes, among them several patents are concerned with the treatment of red mud. For instance, according to FRG Patent No. 1.592.104 solid granules are prepared from red mud which is dissolved in water to be purified. This material consists primarily of iron and aluminum sulfate. Charging of the solid water purifying agent is cumbersome, it dissolves slowly and results in plenty of remaining insoluble precipitate.

With the exception of application No. M1-1055/1987, filed on Apr. 13, 1987, all these processes are, however, single-stage technologies, in the course of which either by-products (waste), or the final product has a large refuse content. Thus, the specific efficiency of the product is small during utilization. In case of multistage, more complex processes, even more waste arises and usually their object is only to recover a single particular target product.

DISCLOSURE OF THE INVENTION

The object of the present invention is to provide a method where, in the course of several consecutive, repeated chemical digestions, "products" are obtained that are valuable end-products even without any further processing and separation, so all the important components of red mud are utilized as various final products. Thus the entire technologic process is waste-free.

The present invention is based partly on the recognition that, in a reaction with $CO_2$ or $CO_2$-containing flue gas, the alkaline sodium content hindering the processing of red mud may be dissolved up to pH 5 in the form of $Na_2CO_3$, by leaving behind other "useful" materials. This is the first useful product. A second discovery relates to the reprocessing of the mud recovered by filtration, in the course of which primarily inorganic pigment powders may be prepared in several divergent technologic processes.

BEST MODE OF CARRYING OUT THE INVENTION

The essence of the method of the invention consists in that several series of technologic operations may be brought about which transform, in parallel and/or series connection, the mud of the first operation into various target products free of waste. First divergent step: the filtered mud is washed with water, a slurry is made thereof which is then refiltered. The washing water is returned into the sodium recovery process.

The filtered mud is:

A/dried,

B/reprocessed.

A/The dried product may be sold as a cheap inorganic pigment, such as concrete paint, etc.

B/Further divergent possibilities during reprocessing:

1. The muddy slurry is treated, under pressure, in a supersaturated state with $CO_2$, in the course of which the Ca and Mg content are dissolved in the form of Ca- and $MgHCO_3$ solutions and may be separated from the other mud fractions by filtration.

The solution may be utilized to produce Ca-, $MgCO_3$ or -sulfate or it may be introduced diluted into the channel.

The filtered mud is treated in a third process as described herebelow in point 2.

2. Without recovering the Ca and Mg content, the muddy slurry is reacted, while mixed, with cold, 10–30% HCl solution in a stainless steel tank, preferably for 2 to 3 hours. During the parallel reactions the bulk of the Ca, Mg, Fe and Ti content, as well as a minor part of the Al content go into solution. The whole quantity of Si (in the form of $SiO_2$), the bulk of the Al content and other microimpurities remain in the floating, fine-disperse phase. The dissolved product is a solution with clarifying activity.

The mud removed by filtration may be sold—in a given case cleaned by a further acid treatment or washing and after drying—as a varnish paint, a filler used in the rubber or plastics industry or as a filter aid.

3. The Ca- and Mg-containing mud, or the mud filtered according to method 1, is reacted with cc. hydrochloric acid, in an enamelled double autoclave, while boiling and mixing. During this, the (Ca, Mg) Fe, Al and Ti content, as well as other impurities of the mud are dissolved and there arises a fine-disperse solid phase with high $SiO_2$ content (70% on an average) and containing furthermore $Al_2O_3$ and $TiO_2$. The solution may be utilized as a clarifier and the solid part, after washing and drying, in the fields described in point 2.

4. The filtered mud of method 1 is treated with (preferably 5–50%) citric acid in order to recover the Fe content. The filtered mud of the treatment is utilized as a filler, and the Fe-citrate solution is utilized as an active ingredient of fertilizers containing micro-elements, or $Fe_2CO_3$ pigment may be obtained by evaporating and heating the solution or precipitating it with $NH_4OH$ in $Fe/OH/_3$ form, further, filtering, drying and heating it.

In the course of processing the mud of method 1, iron oxide pigments may be produced from the solutions obtained according to methods 2 and 3, by treating the solutions with alkali, during which treatment a Fe-/OH/$_3$ precipitate is separated. The precipitate is filtered, washed, dried and heat-treated. The final product is—depending on the heat treatment—a yellow, red or black pigment the shade of which depends on the purity.

The material with high $SiO_2$ content of the methods 2, 3 and 4 is also reprocessible by reacting it with a concentrated NaOH solution at a temperature of 100° to 140° C. under pressure or at atmospheric pressure, with constant mixing. The solution obtained may be utilized as a material corresponding to water glass.

If the $SiO_2$-containing material is a powder, it is heated, mixed with soda ($Na_2CO_3$)—preferably with the product isolated from the $Na_2CO_3$ solution obtained in the first step—to obtain solid water glass, by the conventional, well-known technique.

We claim:

1. A method for the processing of red mud, said red mud comprising a slurry of metal oxides, including $Fe_2O_3$, $Al_2O_3$, $TiO_2$, $SiO_2$ and $Na_2O$, said method comprising
   a) reacting said slurry with carbon dioxide gas whereby to form a product including a solution of $Na_2CO_3$, the reaction with carbon dioxide gas being allowed to proceed until said product attains a pH level of from about 5 to 9;
   b) filtering the product of step a to separate the solution of $Na_2CO_3$ therefrom, thereby leaving a filtered mud; and
   c) treating said filtered mud to form one or more inorganic pigments, fillers, and/or flocculants.

2. A method as claimed in claim 1 wherein the treatment of said filtered mud consists essentially of drying it to form an inorganic pigment.

3. A method as claimed in claim 1 wherein the treatment of said filtered mud comprises supersaturating the filtered mud with carbon dioxide under pressure to fractionate the filtered mud into a soluble fraction of $CaHCO_3$ and $MgHCO_3$ and an insoluble fraction comprising oxides of Fe, Al, Ti, and Si, said method further comprising
   a) separating said soluble $CaHCO_3$ and $MgHCO_3$ fraction from said insoluble fraction,
   b) digesting the insoluble fraction in an aqueous acid solution to form a soluble part comprising dissolved Fe, Al and Ti and an insoluble part comprising a high content of $SiO_2$, and
   c) separating said insoluble part from said soluble part whereby the insoluble part may be used as an additive and the soluble part may be used as a flocculant.

4. A method as claimed in claim 3, wherein said method further comprises treating said soluble fraction to form a sulfate or carbonate of calcium or magnesium.

5. A method as claimed in claim 3, wherein said aqueous acid solution comprises about 10–33% HCl.

6. A method as claimed in claim 1, wherein the treatment of said filtered mud comprises digesting the filtered mud with an aqueous acid solution to form a soluble portion comprising dissolved Ca, Mg, Fe, Al and Ti and an insoluble portion comprising a high content of $SiO_2$, and separating said insoluble portion from said soluble portion whereby the insoluble portion may be used as an additive and the soluble portion may be used as a flocculant.

7. A method as claimed in claim 6, wherein said aqueous acid solution comprises about 10–30% HCl.

8. A method as claimed in claim 3, said method further comprising reacting the insoluble part with NaOH while mixing at a temperature of about 100° to 140° C. to form a water glass solution.

9. A method as claimed in claim 3, said method further comprising washing and drying said insoluble part to form a powder which is substantially acid-free and treating said powder with $Na_2CO_3$ or $K_2CO_3$ to obtain water glass.

10. A method as claimed in claim 9, wherein the powder is treated with $Na_2CO_3$, which is separated from the product in step b of claim 5.

11. A method as claimed in claim 1, wherein the treatment of said filtered mud comprises digesting the filtered mud with citric acid to form a Fe-citrate solution and an insoluble fraction, whereby the Fe-citrate solution may be used as an active ingredient in a fertilizer and the insoluble fraction may be used as a filler.

12. A method as claimed in claim 11, said method further comprising evaporating and heating the Fe-citrate solution to obtain a $Fe_2CO_3$ pigment.

13. A method as claimed in claim 11, said method further comprising treating the Fe-citrate solution with an alkali to separate $Fe(OH)_3$ precipitate and converting the precipitate into iron oxide pigment.

14. A method as claimed in claim 13, wherein the alkali is NaOH or $NH_4OH$ solution.

15. A method as claimed in claim 3, said method further comprising treating the soluble part formed in step b of claim 7 with an alkali to separate $Fe(OH)_3$ precipitate and converting the precipitate into iron oxide pigment.

16. A method as claimed in claim 15, wherein the alkali is NaOH or $NH_4OH$ solution.

17. A method as claimed in claim 6, said method further comprising treating the soluble portion with an alkali to separate $Fe(OH)_3$ precipitate and converting the precipitate into iron oxide pigment.

18. A method as claimed in claim 17, wherein the alkali is NaOH or $NH_4OH$ solution.

19. A method as claimed in claim 6, said method further comprising reacting the insoluble portion with NaOH while mixing at a temperature of about 100° to 140° to form a water glass solution.

20. A method as claimed in claim 6, said method further comprising washing and drying said insoluble portion to form a powder which is substantially acid-free and treating said powder with $Na_2CO_3$ or $K_2CO_3$ to obtain water glass.

* * * * *